INVENTOR.
Solomon Sagall
BY Michael S. Striker
Attorney

INVENTOR.
Solomon Sagall
BY Michael S. Striker
Attorney

Feb. 22, 1966 S. SAGALL 3,236,941

SUBSCRIPTION TELEVISION SYSTEM WITH WIRED AUDIO DISTRIBUTION

Filed June 26, 1961 3 Sheets-Sheet 3

INVENTOR.
Solomon Sagall
BY
Michael S. Striker
Attorney

United States Patent Office 3,236,941
Patented Feb. 22, 1966

3,236,941

SUBSCRIPTION TELEVISION SYSTEM WITH WIRED AUDIO DISTRIBUTION

Solomon Sagall, New York, N.Y., assignor to Teleglobe Pay-TV System, Inc., New York, N.Y.

Filed June 26, 1961, Ser. No. 119,647
19 Claims. (Cl. 178—5.1)

The present invention relates to television systems. More particularly, the invention relates to that type of television system wherein the television signals may be received only by a predetermined group of users or subscribers, such as for example, a group of subscribers in a so-called pay-as-you-see television system.

The present application is a continuation-in-part application of copending United States patent application Serial No. 673,520, filed July 22, 1960.

In known television systems of this type, it is essential that the receiver of each user or subscriber be modified so as to be capable of receiving the signals. For example, by adding certain devices to a television receiving set the latter receives incomprehensible signals which may be rendered comprehensible by actuation of a coin-operated device or by the use of a card of preselected physical characteristics, this card being obtained by the user upon payment of a fee. In such known television systems certain disadvantages exist due to the fact that the subscriber's receiver has to be modified, such as, for example, by having additional equipment connected thereto. In the first place, the connecting of additional structure to the receiver is a considerable inconvenience to the subscriber. For example, the receiver may not be used while the additional structure is being joined thereto and the operation of the receiver may be undesirably influenced by the additional structure. In the second place, should the receiver stop operating properly, the subscriber does not know whether the defect is in the part of the receiver which is under subscription or in the remainder of the receiver arrangement, and as a result the subscriber does not know which repair service to contact. Furthermore, the use of the receiver is undesirably complicated by the fact that the subscriber must feel the necessity of dealing with at least two distinct service organizations. If the repairs are necessary on any part of the receiver it cannot be used for either the generally available television reception or for the subscription television programs.

In the television system of the present invention, the aforementioned disadvantages are eliminated by providing a television system which requires no contact with an existing television receiver and wherein there is no confusion as to whether operational faults exist or result from general or subscription television programs and as to whether a general television repair man or a subscription television repair man is required.

The television system of the present invention may be utilized, not only for subscription television, but also for television systems such as educational television, participating television programs and also for closed radio transmission and Conelrad transmission in time of emergency.

In accordance with the present invention, a television system comprises a transmitter for transmitting a complete image-forming wireless video signal including vertical and horizontal synchronizing signals, the transmitter including audio means for simultaneously transmitting an audio signal of a frequency within the audible frequency range synchronized with the video signal. A sound reproducing receiver is connected by wire to the audio means and forms an independent unit separate and electrically disconnected from the receiver, the sound reproducing receiver being capable of receiving the wire transmitted audio signal and reproducing the same in synchronism with the video signal. The sound reproducing receiver is an independent unit separate and electrically disconnected from the standard television receiver for receiving and reproducing the video signal. A speaker control cooperates with the sound reproducing receiver for controlling the operation of the speaker (sound reproducing receiver).

The novel features which are considered as characteristic for the invention are set forth in particular in the appended claims. The invention itself, however, both as to its construction and its method of operation, together with additional objects and advantages thereof, will be best understood from a following description of specific embodiments when read in connection with the accompanying drawings, in which:

Figure 1:
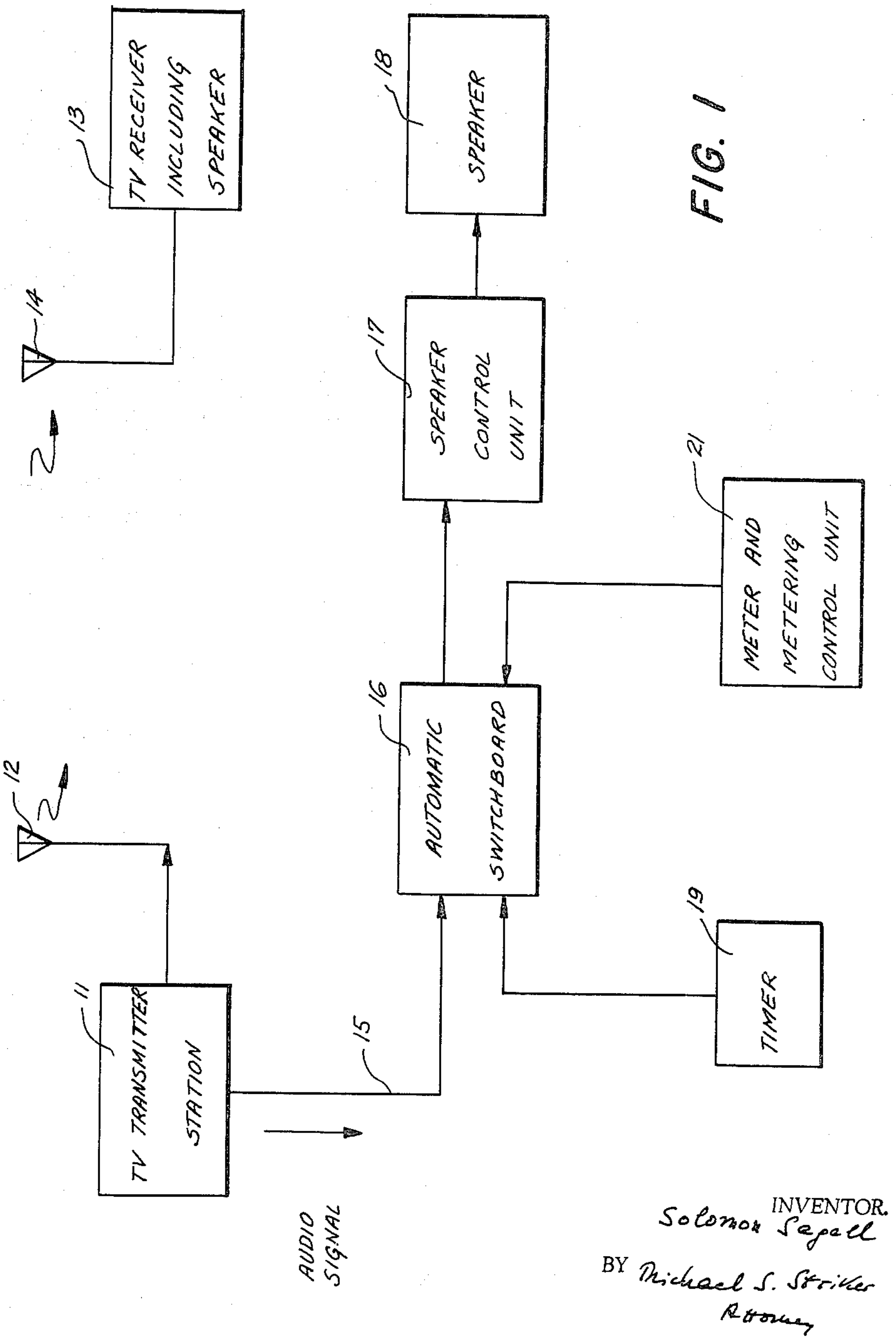
FIG. 1 is a schematic block diagram of an embodiment of the television system of the present invention.

In FIG. 1, a standard television transmitter 11, which may comprise any conventional television broadcasting station, transmits a video signal, through suitable means, such as, for example, an antenna 12, to a conventional television receiver 13 located in the home of a subscriber. The video signal may be received by the standard television receiver 13 through an antenna 14. Of course, although only a single receiver is shown in FIG. 1, the video signal may be received and reproduced by any number of receivers within the broadcasting range of the transmitting station 11. The video signal transmitted through the antenna 12 includes or comprises a complete image forming wireless video signal including vertical and horizontal synchronizing signals.

In addition to the wireless video signal, the transmitting station 11 also transmits or may also transmit an audio signal through the antenna 12 which audio signal will be received and reproduced in a conventional manner by the receiver 13. The audio signal is thus transmitted through the antenna means 12 and received by the antenna means 14 during normal TV transmission. During a subscription transmission, the audio signal transmitted by wireless may be transmitted out of synchronism with the video signal so that the sound reproduced at the standard receiver will not be synchronized with the picture reproduced thereat. In such instance, the audio signal may contain information relating to the video signal to the extent of identifying the video signal so that a user or subscriber or non-subscriber who tunes in on the video signal will not think that the receiver is operating improperly because of the lack of an audio signal or because of the non-synchronism between the audio and video signals. The wireless audio signal may also be used as an advertising medium to provide the subscriber with information as to the program being transmitted and with information about how the subscriber or non-subscriber may obtain an audio signal which is synchronized with the video signal and extolling the virtues of the programs to be transmitted by the subscription system.

The transmitter station 11 also transmits an audio signal which is synchronized with the video signal, and this synchronized audio signal is transmitted through a wire 15 of a telephone system through an automatic switchboard 16 from which it is supplied to a speaker control unit 17 which cooperates with and controls a speaker or sound reproducer 18. The automatic switchboard 16 may comprise any suitable automatic switchboard arrangement, such as, for example, that manufactured by the General Telephone Company.

The speaker or sound reproducer 18 comprises a unit separate from the standard television receiver 13 at least to the extent that the sound reproducer 18 operates entirely independently of said receiver. The sound reproducer may comprise any suitable sound reproducing means, and is controlled by the speaker control unit 17. The speaker control unit 17 comprises suitable means for controlling the energization of the speaker 18 to control whether said speaker reproduces the audio signal or not. Thus, for example, the speaker control unit may comprise manual switch means, automatic switch means operated by suitable subscription devices, such as, for example, punched cards or coins or billing cards, or a resonant relay energized by a suitable manual or automatic switch.

The wire 15 of the telephone system may be included in an existing telephone system or may be a separate telephone type wire. When the system of the present invention is installed, a sound reproducer 18 may be installed in a home and the special line 15 will connect said sound reproducer with the transmitter station 11 through the automatic switchboard 16. However, it is also possible to utilize conventional receivers which have permanently connected thereto, for example, the speaker control unit 17 which operates independently of the conventional receiver and needs only be connected to the telephone line 15. Once the system is installed, connection and disconnection may be made at only point along the telephone line 15, outside the home of the subscriber where the sound reproducer 18 is located, or it may be made right at said sound reproducer. Thus, for example, a connection and disconnection may be made at the automatic switchboard 16 or at the speaker control unit 17.

In a completely automatic system, the subscriber wishing to receive a transmitted subscription program will advise the automatic switchboard 16 of his intent by suitable means, such as, for example, a phone call or the dialing of a code signal on the telephone, since each subscriber has his own line leading to said automatic switchboard. When the automatic switchboard 16 is advised that a subscriber wishes to receiver a subscription program, it may transmit a signal to the speaker control unit 17, which may comprise a resonant circuit which responds to the signal transmitted by said automatic switchboard to close the circuit to the speaker 18 so that any audio signal transmitted thereafter will be routed through said automatic switchboard and through the circuit then closed by said speaker control unit to said speaker of the subscriber who has indicated a desire to receive the program. The speaker control unit 17 may not operate unless the foregoing conditions are present in addition to the condition that the subscriber has either inserted a token or other suitable form of payment for the intended program or has been billed therefor.

In this regard, the subscriber may be billed in accordance with the manner utilized by public utilities. That is, a timer 19 functioning in cooperation and conjunction with a meter and metering control unit 21 may be utilized to cooperate with the automatic switchboard 16 to record the time period that the subscription program is received by the subscriber. The timer 19 and meter and metering control unit 21 may comprise any suitable means utilized to meter or provide a record of the reception time period of the audio signal by the speaker 18.

The operation of the speaker control unit 17 may be utilized to control the timer and meter unit by a feedback circuit connected to said timer and meter control unit so that if the payment is to be made for each program at the subscribers' home, the timer may be energized therefrom. If the payment is made at the speaker control unit 17, there would be no need for the timing, unless the subscriber does not watch or does not receive the entire subscription program and then requests that a prorated charge be made instead of the full charge therefor.

It is thus seen that in the television system of the present invention a non-subscriber will receive a picture at his standard receiver and either no audio signal or an audio signal utilized for advertising purposes, whereas a subscriber will receive a picture at his standard receiver and a synchronized audio signal at the speaker 18 so that he may fully enjoy both the picture and the sound corresponding to the transmitted subscription program.

The speaker control unit 17 may be controlled through a standard 48 volt telephone line voltage so that no auxiliary equipment is necessary for the control of the speaker 18. The automatic switchboard 16 may empower the speaker control unit 17 by supplying the voltage which energizes the frequency resonant relay or a suitable relay included in said speaker control unit. The automatic switchboard 16 automatically starts and stops the metering and/or timing of the reception of the subscription program and disconnects the speaker control unit 17 after each subscription program. The automatic switchboard 16 also supplies the necessary billing information since it operates the timer and meter control unit.

The speaker control unit 17 may comprise a frequency resonant trigger or switch arrangement which stimulates the automatic switchboard unit 16 or transmits a signal thereto to advise automatic switchboard that the speaker 18 corresponding to that speaker control unit 17 is in operating condition. A plurality of speaker control units 17 may be connected to the audio telephone line 15 in a party line arrangement such as is utilized by the telephone company and in which each speaker control unit has its own identifying signal arrangement, such as, for example, a control signal of different frequency from that of the other speaker control units on the party line.

The automatic switchboard 16 permits the contacting of a great number of subscribers through a single TV transmitting station and thus permits the utilization of the audio system as a closed circuit radio network for either paying or non-paying subscribers, and furthermore permits its use in emergencies as a Conelrad transmission system. Thus, for example, a federal, or other, official may actuate the speaker 18 of each of the subscribers from the transmitter station through the automatic switchboard 16 to transmit an unrequested program, in the event of national emergency, to instruct the various subscribers in proper survival procedure, etc.

In accordance with the embodiment of the television system of the present invention shown in FIG. 2, the transmitter station 11 transmits the video signal to the receiver 13 through the antennaes 12 and 14 in the manner described with reference to FIG. 1 and the synchronized audio signal is transmitted in the described manner through the telephone line 15. However, a scrambler 22 functions to distort or block the audio signal and prevent its reproduction by the speaker 18. The scrambler or blocker 22 may comprise any suitable means for either distorting the audio signal or for opening the line to prevent the transmission of the audio signal. The scrambling unit 22 may comprise any suitable form of scrambling unit known in the art and cooperates with the transmitter station to prevent the speaker 18 from reproducing the synchronized audio signal.

A suitable unscrambler 23 may be utilized to unblock the line or to unscramble the scrambled audio signal to eliminate the influence of the scrambler 22 so that the audio transmission is unblocked and the speaker 18 reproduces the audio signal. The unscrambler 23 may include a manual switch for unscrambling or may be automatically controlled. The unscrambler 23 is preferably interposed between the speaker control unit 17, which functions in close conjunction therewith, and the speaker 18.

The subscriber may place in the unscrambler 23 a suitably punched card, which has been previously purchased from the subscription television organization, to close the circuit to permit the clear reproduction of the audio signal or the subscriber may insert a coin or a suitable number of coins to provide this function. The speaker control unit 17 and the unscrambler 23 thus operate in close conjunction in this case, each insuring that no impediment exists to the clear reproduction of the audio signal.

Figure 3:
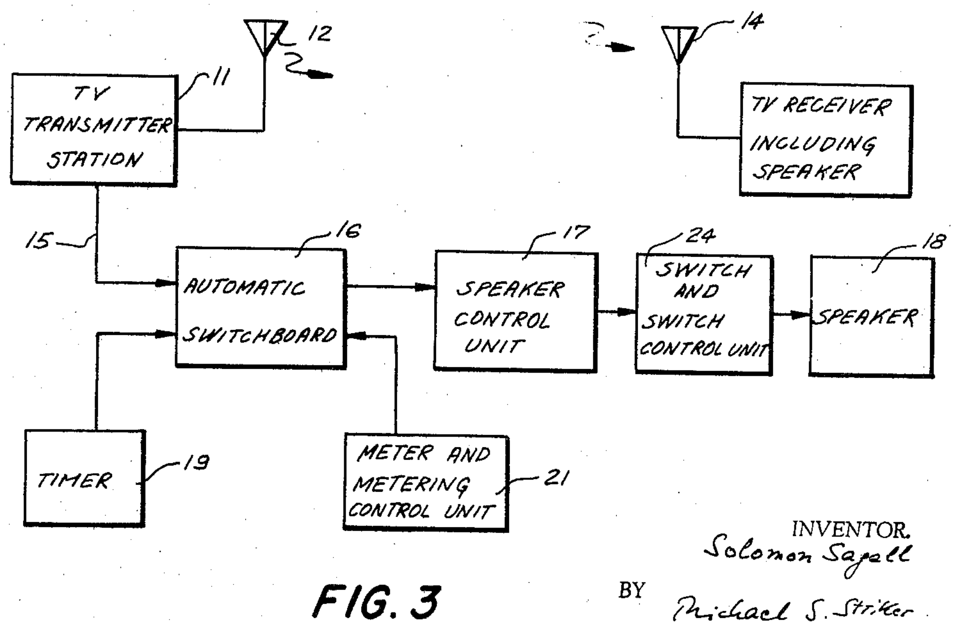
FIG. 3 is a schematic block diagram of an embodiment of the television system of the present invention illustrating a second specific manner of using said television system.

In accordance with the embodiment of the present invention illustrated in FIG. 3, the transmitter station 11 transmits a video signal to the receiver 13 through the antennae 12 and 14 and an audio signal is transmitted to the wire 15 to the sound reproducer or speaker 18. In the embodiment of FIG. 3, however, a switch which is normally open and a switch control unit, both identified as switch and switch control unit 24 are inserted in the line between the speaker control unit 17 and the speaker 18 to cooperate through the line 15 with said speaker to prevent the audio signal from being reproduced thereby. A manually or automatically operable switch control unit may be utilized to close the switch to permit the speaker 18 to reproduce the wire-transmitted audio signal in synchronism with the video signal. The switch and switch control unit 24 may be in the form of a device which is operated by coin, token, punched card, or etc., and may include a receptacle into which the coin is inserted and which may hold the coin, a suitable device being actuated by the coin to maintain the switch closed for a predetermined period of time.

Figure 2:
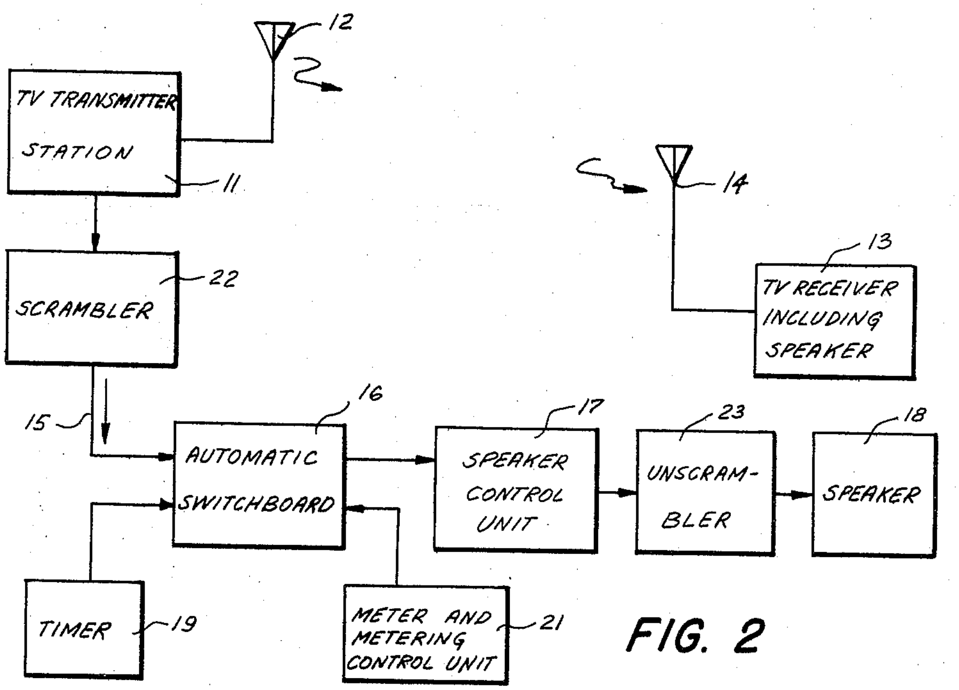
FIG. 2 is a schematic block diagram of an embodiment of the television system of the present invention illustrating a first specific manner of use of said television system.

Although only one receiver and one speaker is shown in each of FIGS. 1, 2 and 3, it is obivous that any number of receivers and speakers may be, and usually are included in the system. Thus, for example, several hundreds of thousands of such receivers may be included in a single subscription system of the present invention.

Figure 4:
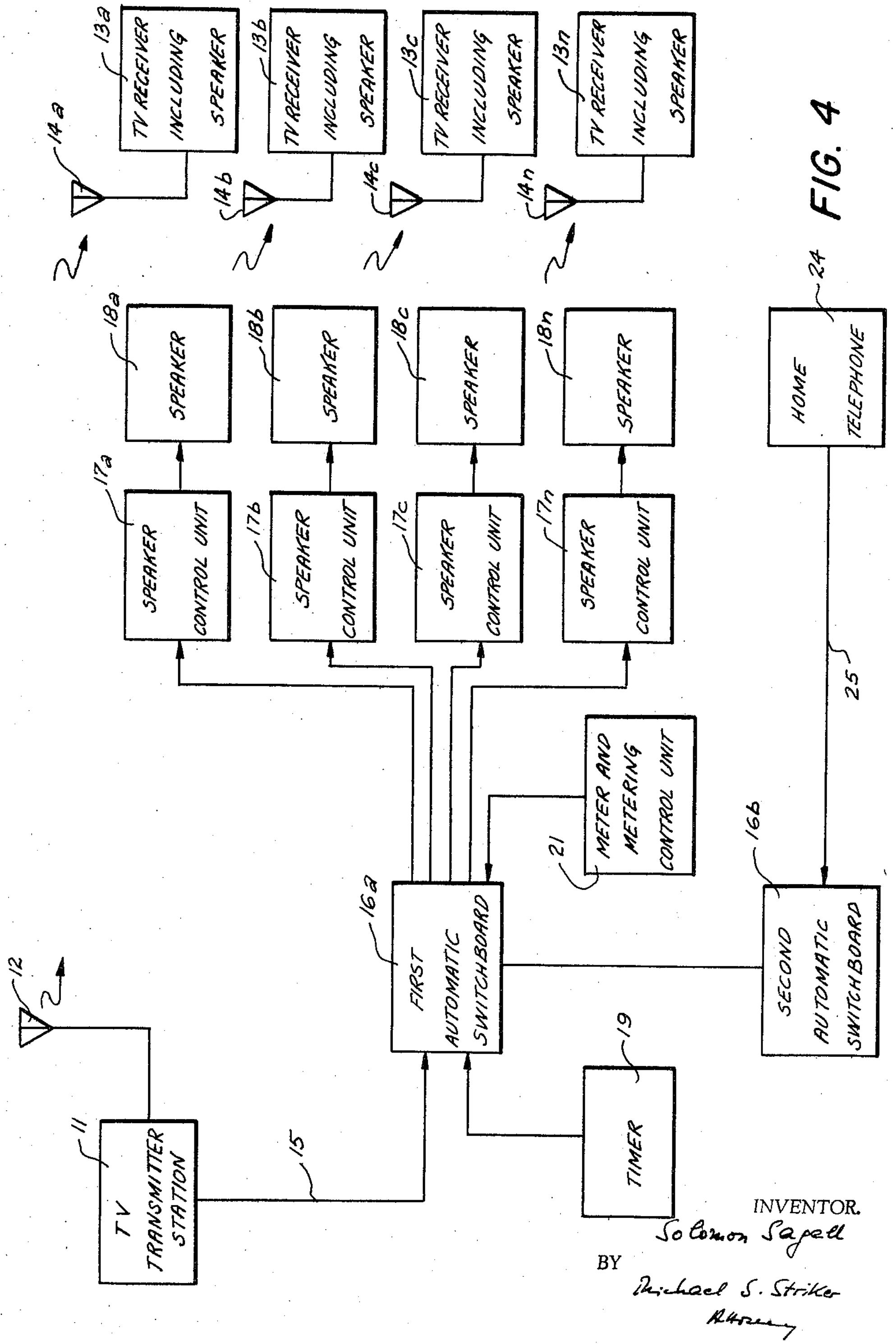
FIG. 4 is a schematic block diagram of an embodiment of the television system of the present invention illustrating a third specific manner of using said television system.

FIG. 4 shows a plurality of standard television receivers **13*a*, 13*b*, 13*c* and 13*n*. Each of the standard television receivers includes a speaker and each receives the wireless transmitted video signal through a corresponding antenna, such as the antennae 14*a*, 14*b*, 14*c* and 14*n*, respectively. In FIG. 4, each of the standard television receivers 13*a*, 13*b*, 13*c* and 13*n* is associated with a corresponding speaker 18*a*, 18*b*, 18*c* and 18*n*, each of which speakers is associated with a corresponding speaker control unit 17*a*, 17*b*, 17*c* and 17*n*. The speaker control units 17*a*, 17*b*, 17*c* and 17*n* are all connected in the telephone system to the telephone line 15 through a first automatic switchboard 16*a***.

In FIG. 4, the first automatic switchboard **16*a* controls the operation of the speaker control units corresponding to the receivers of the subscribers and the speaker control units function to control their associated speakers in accordance with whether the subscription price has been paid or billed. The first automatic switchboard 16*a* functions, in the usual manner of automatic switchboards, to connect the incoming audio signal to any number of outgoing subscriber lines in accordance with whether it has been advised that such subscribers are desirous of receiving the subscription program and/or whether such subscribers have paid or been billed for such subscription program. Thus, the timer 19 and meter and metering control unit 21 function in conjunction with the first automatic switchboard 16*a* to permit the use of a public utility type billing system for the period of time of reproduction of sound by the subscribing receiver. The automatic switchboard 16*a*** may be replaced by a human operator, but this is not advisable where several hundreds of thousands of subscribers are involved.

In the embodiment of FIG. 4, each subscriber may utilize his home telephone to advise a second automatic switchboard **16*b* that he is desirous of receiving a subscription program. The second automatic switchboard 16*b* may be replaced by a manual switchboard having a telephone operator in attendance. When the subscription is desired and the subscriber phones the switchboard 16*b*, the operator at the switchboard either advises the first automatic switchboard 16*a* to close the suitable line to the calling subscriber. If the second switchboard 16*b* is an automatic switchboard, said switchboard 16*b* merely advises the first automatic switchboard 16*a*** directly by suitable signal and the first automatic switchboard closes the line to the calling subscriber. If both switchboards utilized are automatic switchboards then the home subscriber need merely dial a code number on his telephone, which code number will actuate the proper selective operation of the switchboards to selectively connect said subscribed into the line.

Instead of using the usual home telephone 24 with the usual telephone line 25, in order to contact the operator at the switchboard **16*b* or in order to contact the automatic switchboard 16*b*, it is possible to provide in each home a separate telephone which utilizes the same line which interconnects the first automatic switchboard 16*a* with the plurality of speakers 18. With such an arrangement, the switch of each line at the switchboard 16*a* when it is opened closes another switch connected to the lines so as to connect the separate telephone through the same line in a circuit through which the operator at the second automatic switchboard 16*b*** may be contacted or said second automatic switchboard may be contacted.

Of course, instead of a separate telephone 24, it is possible to provide in each home a switch, such as, for example, a push button type of switch or the like, which, when closed, closes a circuit to a buzzer, lamp, or other suitable signalling means located adjacent the switchboard **16*a* so that the user need only press a button in order to signal the use of services desired. Thus, with this latter arrangement, when one of the switches at the switchboard 16*a* is open, another switch is automatically closed to place the line in contact with a signalling device and the circuit through the signalling device is closed upon the operation of a suitable switch device at the home of the subscriber. Therefore, with this arrangement, the same line is used for the transmission of the audio signal and for signalling back that service is desired, and the conventional telephone arrangement 24, 25** is not used.

It is apparent from the foregoing description that with all the embodiments of the invention the conventional television receiver means 13 is in no way changed or effected, so that if television reception is faulty, the subscriber knows that the subscription system is not the cause of the faulty television reception. Once the sound reproducing speaker 18 is connected, it is completely unnecessary for the subscriber to be inconvenienced in any way, and if the system of the invention is faulty the fault may be apparent only in the production of the audio signal by the speaker 18, so that the subscriber immediately knows that his receiver 13 is not at fault.

Moreover, with the system of the present invention, the video signal is transmitted in a conventional way by any existing transmitter, such as a transmitter station 11, to a conventional receiver, such as the television receiver 13, while the synchronized audio signal is transmitted by wire and reproduced in a well known manner which is known to be reliable, so that the system of the present invention requires no testing and may be immediately put into action without the inconvenience of tests and appraisals by government agencies. Moreover, as is apparent from the foregoing description of the several embodiments of the invention, the system of the invention adapts itself without difficulty to any desired type of control such as the scrambling and unscrambling of FIG. 2, the coin-operated switch of FIG. 3, or the telephone operation of FIG. 4. It will be appreciated that each of the elements described above, or two or more together, may also find a useful application in other types of television systems differing from the types described above.

Without further analysis, the foregoing will so fully reveal the gist of the present invention that others may by applying current knowledge readily adapt it for various applications without omitting features that, from the standpoint of prior art, fairly constitute essential characteristics of the generic or specific aspects of this invention and, therefor, such adaptations should and are intended to be comprehended within the meaning and range of equivalence of the following claims.

What is claimed as new and desired to be secured by Letters Patent is:

1. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;
wire means and antenna means connected to said audio means;
standard television receiver means for receiving and reproducing said video signal and said second audio signal;
sound reproducing receiver means connected by said wire means to said audio means, forming an independent unit separate and electrically disconnected from said receiving means, said sound reproducing receiver means being capable of receiving the wire-transmitted first audio signal and reproducing the same in synchronism with said video signal; and
speaker control means cooperating with said sound reproducing receiver means for controlling the operation of said sound reproducing receiver means.

2. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;
wire means and antenna means connected to said audio means;
standard television receiver means for receiving and reproducing said video signal and said second audio signal;
sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal; and
speaker control means cooperating with said speaker means for controlling the operation of said speaker means.

3. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;
wire means and antenna means connected to said audio means;
standard television receiver means for receiving and reproducing said video signal and said second audio signal;
sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal;
speaker control means connected by said wire means to said speaker means for controlling the operation of said speaker means; and
automatic switchboard means connected by said wire means between said audio means and said speaker control means for controlling the operation of said speaker control means.

4. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;
wire means and antenna means connected to said audio means;
standard television receiver means for receiving and reproducing said video signal and said second audio signal;
sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal;
speaker control means connected by said wire means to said speaker means for controlling the operation of said speaker means;
automatic switchboard means connected by said wire means between said audio means and said speaker control means for controlling the operation of said speaker control means to operate said speaker means to reproduce the wire-transmitted first audio signal in synchronism with said video signal; and
timer and meter means operatively coupled to said automatic switchboard means for metering the period of time that said speaker means in operated by said automatic switchboard means to reproduce said first audio signal.

5. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal, scrambler means for distorting said first audio signal before transmission therof, and a second audio signal of a frequency within the audible frequency range non-synchronized with said video signal;
wire means and antenna means connected to said audio means;

standard television receiver means for receiving and reproducing said video signal and said second audio signal;

sound reproducing receiver means connected by said wire means to said scrambler audio means, forming an independent unit separate and electrically disconnected from said receiving means, said sound reproducing receiver means being capable of receiving the wire-transmitted first audio signal and reproducing the same in synchronism with said video signal and including unscrambler means for removing the distortion of said wire-transmitted first audio signal; and speaker control means cooperating with said sound reproducing receiver means for controlling the operation of said sound reproducing receiver means.

6. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal, scrambler means for distorting said first audio signal before transmission thereof, and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means and unscrambler means connected by said wire means to said audio means, forming an independent unit separate and electrically disconnected from said receiving means, said speaker means being capable of receiving the wire-transmitting first audio signal and reproducing the same in synchronism with said video signal and said unscrambler means being adapted to remove the distortion of said wire-transmitted first audio signal; and speaker control means cooperating with said speaker means for controlling the operation of said speaker means.

7. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal, scrambler means for distorting said first audio signal before transmission thereof, and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means connected by said wire means to said audio means and unscrambler means connected by said wire means to said speaker means for removing the distortion of said wire-transmitted first audio signal, forming an independent unit separate and electrically disconnected from said receiving means, said speaker means being capable of receiving the wire-transmitted first audio signal and reproducing the same in synchronism with said video signal;

speaker control means connected by said wire means to said speaker means through said unscrambler means for controlling the operation of said speaker means; and automatic switchboard means connected by said wire means between said scrambler means and said speaker control means for controlling the operation of said speaker control means.

8. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal, scrambler means for distorting said first audio signal before transmission thereof, and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means connected by said wire means to said audio means and unscrambler means connected by said wire means to said speaker means for removing the distortion of said wire-transmitted first audio signal, forming an independent unit separate and electrically disconnected from said receiving means, said speaker means being capable of receiving the wire-transmitted first audio signal and reproducing the same in synchronism with said video signal;

speaker control means connected by said wire means to said speaker means through said unscrambler means for controlling the operation of said speaker means;

automatic switchboard means connected by said wire means between said scrambler means and said speaker control means for controlling the operation of said speaker control means to operate said speaker means to reproduce the wire-transmitted first audio signal in synchronism with said video signal; and timer and meter means operatively coupled to said automatic switchboard means for metering the period of time that said speaker means is operated by said automatic switchboard means to reproduce said first audio signal.

9. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

standard television receiver means for receiving and reproducing said video signal and said second audio signal;

sound reproducing receiver means connected by said wire means to said audio means, forming an independent unit separate and electrically disconnected from said receiving means, said sound reproducing receiver means being capable of receiving the wire-transmitted first audio signal and reproducing the same in synchronism with said video signal;

speaker control means cooperating with said sound reproducing receiver means for controlling tthe operation of said sound reproducing receiver means; and switch means interconnected between said sound reproducing receiver means and said speaker control means for providing selected connection and disconnection between the said speaker control means and the said sound reproducing receiving means.

10. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal;

speaker control means cooperating with said speaker means for controlling the operation of said speaker means; and switch means interconnected between said speaker means and said speaker control means for providing selected connection and disconnection between the said speaker control means and the said speaker means.

11. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal;

speaker control means connected by said wire means to said speaker means for controlling the operation of said speaker means;

automatic switchboard means connected by said wire means between said audio means and said speaker control means for controlling the operation of said speaker control means; and switch means interconnected between said speaker means and said speaker control means for providing selected connection and disconnection between the said speaker control means and the said speaker means.

12. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

standard television receiver means for receiving and reproducing said video signal and said second audio signal;

sound reproducing receiver means comprising speaker means connected by said wire means to said audio means, forming an independent unit separate and electrically disconnected from said receiving means, said speaker means being capable of receiving the wire-transmitted first audio signal and reproducing the same in synchronism with said video signal;

speaker control means connected by said wire means to said speaker means for controlling the operation of said speaker means;

automatic switchboard means connected by said wire means between said audio means and said speaker control means for controlling the operation of said speaker control means to operate said speaker means to reproduce the wire-transmitted first audio signal in synchronism with said video signal;

timer and meter means operatively coupled to said automatic switchboard means for metering the period of time that said speaker means is operated by said automatic switchboard means to reproduce said first audio signal;

switch means interconnected between said speaker means and said speaker control means for providing selected connection and disconnection between the said speaker control means and the said speaker means; and switch control means coupled to said switch means for controlling the operation of said switch means.

13. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

a plurality of standard television receiver means for receiving and reproducing said video signal and said second audio signal;

a plurality of sound reproducing receiver means connected by said wire means to said audio means, each of said sound reproducing receiver means forming an independent unit separate and electrically disconnected from each of said receiving means, each of said sound reproducing receiver means being capable of receiving the wire-transmitted first audio signal and reproducing the same in synchronism with said video signal; and speaker control means cooperating with each of said sound reproducing receiver means for controlling the operation of said sound reproducing receiver means.

14. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

a plurality of standard television receiver means for receiving and reproducing said video signal and said second audio signal;

a plurality of speaker means connected by said wire means to said audio means, each of said speaker means forming an independent unit separate and electrically disconnected from each of said receiving means, each of said speaker means being capable of receiving the wire-transmitted first audio signal and reproducing the same in synchronism with said video signal; and speaker control means cooperating with each of said speaker means for controlling the operation of said speaker means.

15. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

a plurality of standard television receiver means for receiving and reproducing said video signal and said second audio signal;

a plurality of speaker means connected by said wire means to said audio means, each of said speaker means forming an independent unit separate and electrically disconnected from each of said receiving means, each of said speaker means being capable of receiving the wire-transmitted first audio signal and reproducing the same in synchronism with said video signal;

a plurality of speaker control means, each of said speaker control means being connected by said wire means to a corresponding one of said speaker means for controlling the operation of said speaker means; and automatic switchboard means connected by said wire means between said audio means and each of said speaker control means for controlling the operation of said speaker control means.

16. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchronized with said video signal;

wire means and antenna means connected to said audio means;

a plurality of standard television receiver means for receiving and reproducing said video signal and said second audio signal;

a plurality of speaker means connected by said wire means to said audio means, each of said speaker means forming an independent unit separate and electrically disconnected from each of said receiving means, each of said speaker means being capable of receiving the wire-transmitted first audio signal and reproducing the same in synchronism with said video signal;

a plurality of speaker control means, each of said speaker control means being connected by said wire means to a corresponding one of said speaker means for controlling the operation of said speaker means; automatic switchboard means connected by said wire means between said audio means and said plurality of speaker control means for controlling the operation of selected ones of said speaker control means to operate the corresponding ones of said speaker means to reproduce the wire-transmitted first audio signal in synchronism with said video signal; and timer and meter means operatively coupled to said automatic switchboard means for metering the periods of time that the selected ones of said speaker means are operated by said automatic switchboard means to reproduce said first audio signal.

17. In a television system, in combination, transmitting means for transmitting a complete image forming wireless video signal including vertical and horizontal synchronizing signals, said transmitting means including audio means for simultaneously transmitting a first audio signal of a frequency within the audible frequency range synchronized with said video signal and a second audio signal of a frequency within the audible frequency range non-synchroniged with said video signal;

wire means and antenna means connected to said audio means;

a plurality of standard television receiver means for receiving and reproducing said video signal and said second audio signal;

a plurality of speaker means connected by said wire means to said audio means, each of said speaker means forming an independent unit separate and electrically disconnected from each of said receiving means, each of said speaker means being capable of receiving the wire-transmitted first audio signal and reproducing the same in synchronism with said video signal;

a plurality of speaker control means, each of said speaker control means being connected by said wire means to a corresponding one of said speaker means for controlling the operation of said speaker means;

first automatic switchboard means connected by said wire means between said audio means and said plurality of speaker control means for controlling the operation of selected ones of said speaker control means to operate the corresponding ones of said speaker means to reproduce the wire-transmitted first audio signal in synchronism with said video signal;

timer and meter means operatively coupled to said first automatic switchboard means for metering the periods of time that the selected ones of said speaker means are operated by said first automatic switchboard means to reproduce said first audio signal; and second automatic switchboard means connected to said first automatic switchboard means for selectively controlling the operation of said first automatic switchboard means to control the operation of selected ones of said speaker control means to operate the corresponding ones of said speaker means to reproduce the wire-transmitted first audio signal in synchronism with said video signal.

18. In a pay television broadcasting system, in combination, a television broadcasting station including video transmitter means for transmitting an image-forming wireless video signal, said broadcasting station including audio means for producing an audio signal synchronized with said video signal simultaneously with same; a plurality of receiving stations, each receiving station including a standard television receiver having a standard video part for receiving and reproducing said video signal and an audio part adapted to receive and reproduce an audio signal, each receiving station including a sound reproducing means which is electrically independent of said audio part of said standard television receiver; a central station; first wire means connecting said central station with said audio means of said broadcasting station; a plurality of second wire means connected at said central station with said first wire means and being respectively connected with the sound reproducing means at one of said plurality of receiving stations and disconnected from said audio parts of said standard television receivers; a normally open control switch means at said central station in each of said second wire means for preventing said audio signal of said broadcasting station from reaching the respective sound reproducing means; and operator influenced means at each of said receiving stations respectively connected to the respective second wire means at the respective receiving station for transmitting through said second wire means signals to said central station for effecting closing of the respective control switch means at said central station so that the respective sound reproducing means receives said audio signal from said broadcasting station and reproduces said audio signal in the form of sound in synchronism with the video signal reproduced by said video part of said standard television receiver at the same receiving station.

19. A broadcasting system as claimed in claim 18, wherein said central station is an exchange of a telephone system.

References Cited by the Examiner

UNITED STATES PATENTS

| | | | |
|---|---|---|---|
| 1,932,253 | 10/1933 | Ives | 178—5.6 |
| 2,510,046 | 5/1950 | Ellett | 178—5.1 |
| 2,573,349 | 10/1951 | Miller | 178—5.1 |
| 2,671,165 | 3/1954 | Gilpin | 325—32 |

DAVID G. REDINBAUGH, *Primary Examiner.*

ROY LAKE, *Examiner.*